United States Patent Office 2,694,483
Patented Nov. 16, 1954

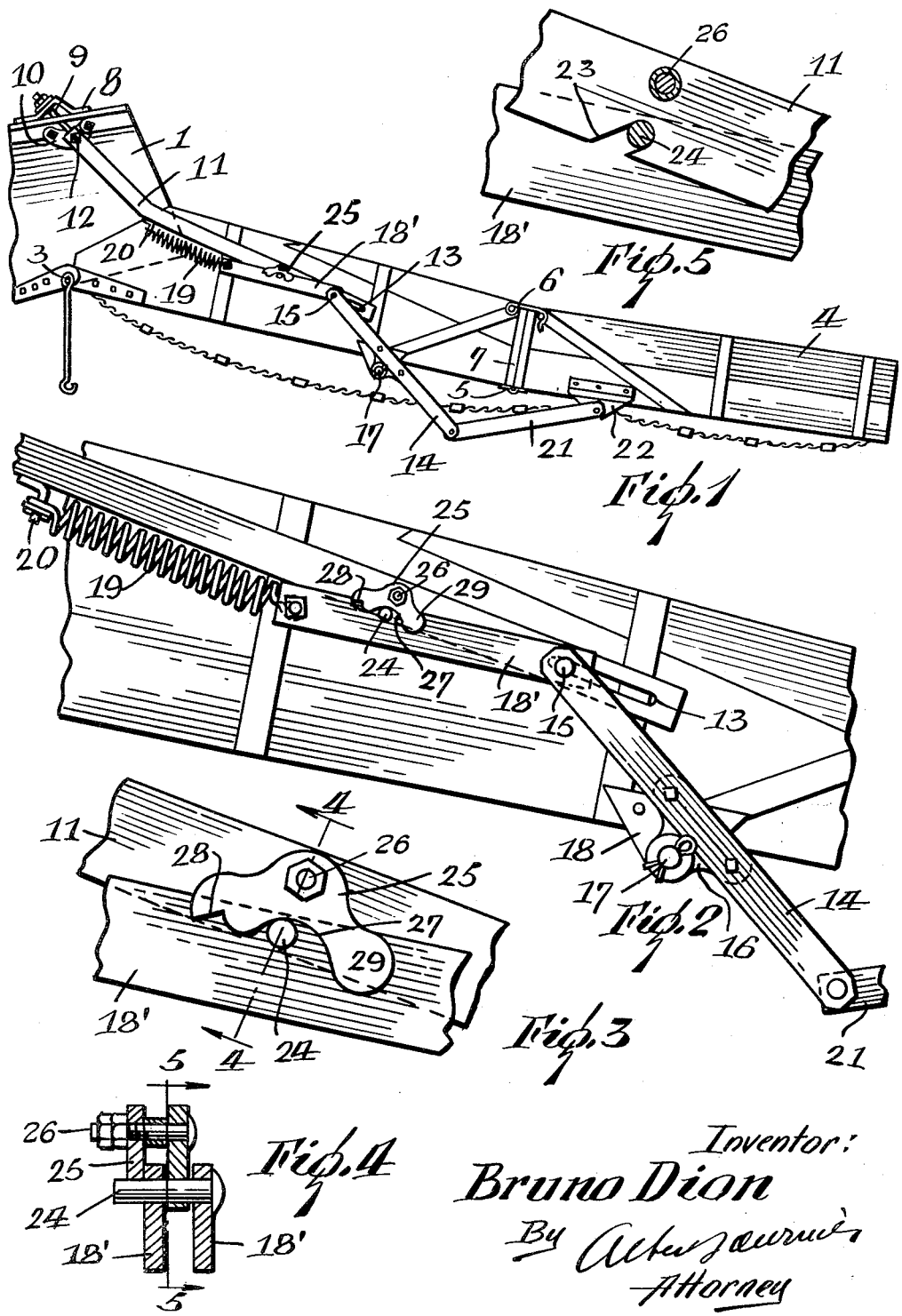

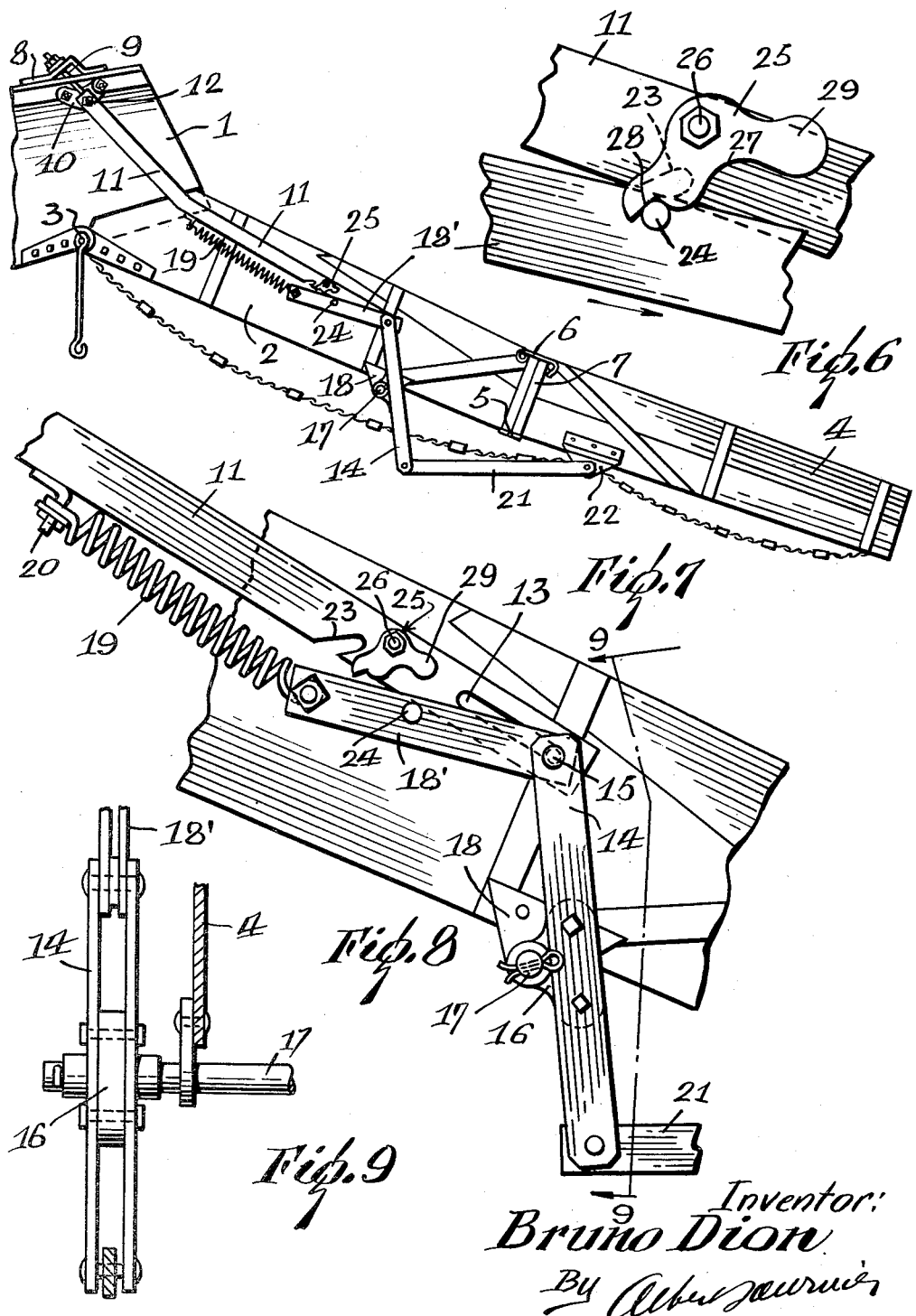

2,694,483

ADJUSTABLE FEEDER APRON FOR AGRICULTURAL MACHINES

Bruno Dion, Ste.-Therese de Blainville, Quebec, Canada, assignor to Dion Freres Inc., Ste.-Therese de Blainville, Quebec, Canada Application January 22, 1952, Serial No. 267,552

5 Claims. (Cl. 198—123)

The present invention pertains to a novel adjustable feeder apron for threshers and like machines and resides in improvements in the device shown in United States Patent No. 2,550,978 of May 1, 1951, and Canadian Patent No. 476,257 of August 21, 1951. The feeder apron slopes downward from the body of the machine and it is often desirable to change the angle of the slope.

The principal object of the invention is to provide a construction whereby this adjustment is easily made by hand. Another object is to provide a construction that is simpler and more positive in operation than that shown in the aforementioned patent.

In the accomplishment of these objects, the upper end of this feeder apron is pivoted to the body of the machine, and an adjusting mechanism is mounted at each side of the apron. Each such mechanism comprises an arm extending from the body and having a slidable connection to the end of a lever on the apron. The other end of the lever in linked to the body. The first end of the lever is connected to the arm through another link and a spring. The second link carries a pin receivable in a notch in the arm to hold the apron in its raised or upper position. A dog on the arm holds the pin from slipping out of the notch.

To lower the apron, it is first lifted slightly to remove the pin from the notch. The dog is so constructed that it prevents the pin from re-entering the notch in this movement. The apron is then dropped and its lower position is determined by the limit of the sliding connection between the arm and the lever.

The spring expands as the apron is dropped and thus aids in lifting the apron when returned to its upper position.

The invention is fully disclosed by way of example in the following description and in the accompanying drawings in which:

Figure 1 is a side elevation of the device;
Figure 2 is an enlarged detail thereof;
Figure 3 is a further enlarged detail;
Figure 4 is a section on the line 4—4 of Figure 3;
Figure 5 is a section on the line 5—5 of Figure 4;
Figure 6 is a detail similar to Figure 3 in a transitional position;
Figure 7 is a side elevation in the lower position;
Figure 8 is an enlarged detail thereof, and
Figure 9 is a section on the line 9—9 of Figure 8.

Reference to these views will now be made by use of like characters which are employed to designate corresponding parts throughout.

In Figure 1, is shown a rear body portion 1 of a threshing machine. This portion is fixed on the wheeled machine and receives the grain bundles to be fed to the upper and lower parts of the machine.

An upper feeder section 2, slopes downward from the member, and is hinged to this member at 3. To the lower end of the section 2, is attached a lower chute section 4 by means of a bottom hinge 5. A hook 6 covers the upper ends of the hinge leaves to hold them from separating.

On the upper edge of the member 1, is secured a bracket 8 in which is mounted a stem 9. The construction associated therewith, is provided in each side of the chute, and therefore it will be necessary to describe only the construction at one side. A reinforcing plate 10, is secured to the member 1 adjacent to the stem 9. To the lower end of the stem 9, is attached an arm 11 by a bolt 12 which passes slidably through the plate 10, as in the aforementioned patent.

The free end of the arm 11, is slotted lengthwise at 13 to guide one end of a lever 14 by a pin 15 slidable in the slot. An intermediate part of the lever carries a fulcrum plate 16, receiving a transverse shaft 17 mounted in a bracket 18 bolted to the chute section 2. A link 18' has one end mounted on the pin 15 and its other end joined by a balance spring 19 to a fixed member 20 on the arm 11. The lever 14 and link 18' may be doubled at each side of the chute as shown in Figure 9. The remaining end of the lever 14, is connected by a link 21 to a bracket 22, on a lower or downward portion of the section 4.

The lower edge of the arm 11 is formed with a rearwardly extending notch 23 adapted to receive a holding pin 24 on the link 18', to determine and maintain the upper position of the chute as in Figures 1–4. Rearward is the direction from the rear body portion 1 toward the section 4, and forward is opposite thereto. Above the notch 23, a specially constructed dog 25, is pivotally mounted on the arm 11, by a pin 26. The sections 2 and 4 together comprise the feeder apron.

In the upper position of the apron its weight acts through link 21 and lever 14 to move the pin 15 downward and to the rearward end of slot 13, thereby pushing pin 24 upward in the lower edge of notch 23. At this time the pin 24 lies in a recess 27 in the dog 25, whereby the pin 24 actuates the dog on further adjustments as will be described.

In order to adjust the apron to a lower position, the lower end of the apron is first lifted. This movement pushes the pin 15 farther into the forward end of slot 13, thereby shifting the link 18' forward and removing the pin 24 from notch 23 while also tilting the dog 25 as shown in Figure 6. At the end of the movement, the pin 24 seats in a notch 28 in the forward end of the dog and is thus held from re-entering the notch 23.

The lower end of the apron is now dropped. The weight of the apron swings the lever 14 clockwise to a nearly vertical position as in Figures 7 and 8 bringing the pin 15 to a stopping position at the rear end of slot 13. This position limits the downward movement of the apron. The pin 24 is held against the lower edge of the arm 11 clear of the notch 23, and the spring 19 expands by the pull on the link 18.

To return the apron to the upper position it is lifted manually at the free end until the pin 24 is returned to the notch 23. The lifting is aided by the tensioned balance spring 19. The unnotched end 29 is weighted sufficiently to hold the dog 25 in the retaining position shown in Figures 2 and 3.

Although a specific embodiment of the invention has been illustrated and described, it will be understood that various alterations in the details of construction may be made without departing from the scope of the invention as indicated by the appended claims.

What I claim is:

1. In an agricultural machine, a body, a feeder apron hinged thereto, an arm extending from said body along said apron and having an intermediate notch and a lengthwise slot in its free end, a lever fulcrumed between its ends on said apron and having one end slidable in said slot, a link connecting the other end of said lever to said apron, another link having one end connected to said lever at said slot, a spring connecting the other end of the second link to said arm, and a pin on the second link and receivable in said notch.

2. In an agricultural machine, a body, a feeder apron hinged thereto, an arm extending from said body along said apron and having an intermediate notch and a lengthwise slot in its free end, a lever fulcrumed between its ends on said apron and having one end slidable in said slot, a link connecting the other end of said lever to said apron, another link having one end connected to said lever at said slot, a spring connecting the other end of the second link to said arm, and a pin on the second link and receivable in said notch, and a dog pivotally mounted on said arm and having a recess in its lower edge adapted to receive said pin.

3. In an agricultural machine, a body, a feeder apron hinged thereto, an arm extending from said body along said apron and having an intermediate notch and a lengthwise slot in its free end, a lever fulcrumed between its ends on said apron and having one end slidable in said slot, a link connecting the other end of said lever to said apron, another link having one end connected to said lever at said slot, a spring connecting the other end of the second link to said arm, and a pin on the second link and receivable in said notch, and a dog pivotally mounted on said arm and having a recess in its lower edge adapted to receive said pin, said dog having a notch in one end positioned to receive said pin as it is withdrawn from the first notch.

4. In an agricultural machine, a body, a feeder apron hinged thereto, an arm extending from said body along said apron and having an intermediate notch and a lengthwise slot in its free end, a lever fulcrumed between its ends on said apron and having one end slidable in said slot, the fulcrum of said lever lying below the slotted-end of said arm, a link extending rearwardly from the other end of said lever and connected to said apron, another link connected to said lever at said slot, said second link extending forwardly, a spring connecting the other end of the second link to said arm, and a pin on the second link and receivable in said notch.

5. In an agricultural machine, a body, a feeder apron hinged thereto, an arm extending from said body along said apron and having an intermediate notch and a lengthwise slot in its free end, a lever fulcrumed between its ends on said apron and having one end slidable in said slot, the fulcrum of said lever lying below the slotted-end of said arm, a link extending rearwardly from the other end of said lever and connected to said apron, another link connected to said lever at said slot, said second link extending forwardly, a spring connecting the other end of the second link to said arm, and a pin on the second link and receivable in said notch, and a dog pivotally mounted on said arm and having a recess in its lower edge adapted to receive said pin.

References Cited in the file of this patent

UNITED STATES PATENTS

| Number | Name | Date |
|---|---|---|
| 762,979 | Berns | June 21, 1904 |
| 1,441,851 | Hartley | Jan. 9, 1923 |
| 2,550,978 | Dion | May 1, 1951 |